United States Patent
Kim et al.

(10) Patent No.: US 7,643,111 B2
(45) Date of Patent: Jan. 5, 2010

(54) LIQUID CRYSTAL DISPLAY DEVICE AND FABRICATION METHOD THEREOF

(75) Inventors: Jeong Hyun Kim, Gyeonggi-Do (KR); Myoung Ho Lee, Gyeonggi-do (KR); Min Joo Kim, Seoul (KR); Se Jong Shin, Daegu (KR); Bong Chul Kim, Daegu (KR); Seung Hyun Lee, Seoul (KR); Kyo Yong Koo, Gyeongsangbuk-Do (KR); Hyeon Jin Seo, Gyeongsangbuk-Do (KR)

(73) Assignee: LG. Display Co., Ltd., Seoul (KR)

( * ) Notice: Subject to any disclaimer, the term of this patent is extended or adjusted under 35 U.S.C. 154(b) by 408 days.

(21) Appl. No.: 11/435,679

(22) Filed: May 17, 2006

(65) Prior Publication Data

US 2006/0263920 A1    Nov. 23, 2006

(30) Foreign Application Priority Data

May 18, 2005    (KR) .................. 10-2005-0041799

(51) Int. Cl.
    *G02F 1/1339*    (2006.01)
(52) U.S. Cl. .............. 349/108; 349/155; 349/156
(58) Field of Classification Search .......... 349/106, 349/108, 123, 155, 156
See application file for complete search history.

(56) References Cited

U.S. PATENT DOCUMENTS 6,330,048 B1    12/2001    Shiomi et al.

2004/0263765 A1*    12/2004    Han et al. .................. 349/155

FOREIGN PATENT DOCUMENTS

| DE | 29 31 113 | | 2/1981 |
|---|---|---|---|
| EP | 1 489 455 | A1 | 12/2004 |
| JP | 57-058124 | | 4/1982 |
| JP | 01-254919 | | 10/1989 |
| JP | 06-289404 | | 10/1994 |
| JP | 07-144939 | | 6/1995 |
| JP | 11-24083 | A | 1/1999 |
| JP | 11-223821 | | 8/1999 |
| JP | 2001-109002 | | 4/2001 |
| JP | 2003-228075 | | 8/2003 |
| JP | 2003270640 | | 9/2003 |

(Continued)

OTHER PUBLICATIONS

Office Action issued in corresponding German Patent Application No. 10 2006 023 138.4; issued May 28, 2008.

(Continued)

*Primary Examiner*—Minh-Loan T Tran
(74) *Attorney, Agent, or Firm*—Brinks Hofer Gilson & Lione

(57) ABSTRACT

A liquid crystal display (LCD) device and its fabrication method are disclosed. Specifically, a fabrication method in which polyhedral spacers are implemented on a substrate through an ink jet method are used for an LCD device. The spacers have the polyhedral shape to increase their contact area with two substrates, and include a surface processed layer for strengthening a bonding force in its bonding with an alignment film formed on the two substrates. The spacers have a polyhedral shape for maintaining the cell gap between the substrates.

3 Claims, 6 Drawing Sheets

FOREIGN PATENT DOCUMENTS

| | | |
|---|---|---|
| JP | 2004-334009 | 11/2004 |
| JP | 2005-010412 | 1/2005 |
| JP | 2005-121738 | 5/2005 |
| JP | 2005-258176 | 9/2005 |
| JP | 2006-284738 | 10/2006 |
| KR | 10-2005-0043073 | 5/2005 |

OTHER PUBLICATIONS

Notification of the First Office Action for corresponding Chinese Patent Application Serial No. 200610081346.4, dated Sep. 14, 2007.

Office Action issued in corresponding Japanese Patent Application No. 2006-139443; issued Aug. 25, 2009.

* cited by examiner

LIQUID CRYSTAL DISPLAY DEVICE AND FABRICATION METHOD THEREOF

This application claims the benefit of the Korean Patent Application No. P2005-41799, filed on May 18, 2005, which is hereby incorporated by reference as if fully set forth herein.

BACKGROUND

As various types of mobile electronic devices such as a mobile phone, a personal digital assistant ("PDA") and a notebook computer are increasingly being developed, the demands for a flat panel display devices which are light, thin, short and small are also increasing. Accordingly, the flat panel display devices, such as a Liquid Crystal Display ("LCD"), a Plasma Display Panel ("PDP"), a Field Emission Display ("FED"), a Vacuum Fluorescent Display ("VFD") and the like are actively studied. Among them, the LCD device receives a great deal of attention because of its mass-production technique, its facilitation of a driving unit and high picture quality.

The LCD device includes an array substrate on which unit pixels are arranged in a matrix form, a color filter substrate facing the array substrate and displaying color, and a liquid crystal layer filled between the two substrates. The array substrate and the color filter substrate are coupled by a seal line formed at their edge portion and a cell gap is formed therebetween. The cell gap formed entirely through the two substrates is uniformly maintained by spacers.

The spacers may be divided into ball spacers and column spacers. The ball spacers have a fine ball shape, and are formed on the color filter substrate or on the lower array substrate according to a spreading method. The column spacers are formed from a photosensitive organic film by using a photo process. The column spacers are not able to be formed between alignment films of the substrates because of the photo process that is used for creation prevents an alignment layer to be present under and over the column spacers. The alignment layer may be added when the column spacer is in place, so the alignment layer on the column spacer may be next to the alignment layer of one of the substrates.

The ball spacer forming method may be divided into a wet spreading or a dry spreading method. Specifically, the wet spreading method includes mixing spacers in a liquid, such as alcohol, and spreading them. The dry spreading method involves spreading only spacers and includes a static electricity spreading method using static electricity and an antistatic spreading method which uses the spraying pressure of a gas. The antistatic spreading method is largely used for a liquid crystal display panel, which is weak against static electricity.

The formation of ball spacers by using the spreading method is advantageous in that spacers may be easily formed, however the spreading method makes it relatively difficult to form spacers at desired positions and it is difficult to make spreading density uniform. Thus, when spacers are formed according to the spreading method, they may be formed on a pixel region where an image is displayed resulting in degradation of an aperture ratio. Also spreading spacers may gather to cause a defective screen with a possible blot pattern.

The column spacer forming method using the photo process is advantageous in that spacers are formed using a mask designed according to the spacers' formation positions. Accordingly, the spacers' formation positions may be freely controlled and spacers' formation density and form may be also freely controlled. The column spacer forming method has a problem in that it uses the photo process. Specifically, photosensitive films can result in excess waste in order to form spacers, causing an increase in cost and environmental pollution. In addition, since a high-priced mask must be used for the photo process and several additional processes must be performed, the method is not economical.

Thus, instead of the method for forming column spacers by using the photosensitive film and the photo process, a method for forming an appropriate amount of spacers at certain positions by using an ink jet method may be used. The ink jet spraying method for spacers uses a bar type spray nozzle having a plurality of spray holes formed at certain intervals. The spraying nozzle may form a small amount of spacers on a desired position by a dropping method, so the amount of spacers may be reduced compared with the column spacer forming method. In addition, the position for the formation of spacers may be controlled as compared to the ball spacer forming method according to the spreading method.

FIG. 1 is a perspective view showing a method for forming spacers according to a general ink jet spraying method. FIG. 2 shows a section of spacers formed according to the general ink jet spraying method.

As shown in FIG. 1, after an ink jet head 101 is aligned on a color filter substrate 100, spacers 104 are sprayed through a plurality of nozzles formed at the ink jet head 101. The spacers 104 may be formed on the array substrate or on the color filter substrate. Color filter layers 102 are formed in a matrix form on the color filter substrate 100. A black matrix 103 is formed between color filter layers 102 and prevents a light leakage.

The spacers formed by the general ink jet spraying method are sprayed on the black matrix 103, evading the color filter layers 102 defining a pixel region to increase an aperture ratio of the liquid crystal display panel. In addition, for forming spacers according to the ink jet spraying method, solid spherical spacers are put in a volatile solvent and dropped. When the solvent and spacers are dropped, the solvent is volatilized to leave only the spacers. In general, a drop of solvent includes a plurality of spacers. The plurality of spacers are collected and serve as substantial spacers to maintain a cell gap between the upper and lower substrates.

With reference to FIG. 2, the sprayed spacers 201 have a spherical shape. If the size of each spacer is not uniform, the cell gap may differ according to its position. If the spherical spacers 201 formed according to the ink jet method are too large in size, pressure may be generated on the upper substrate 100 or on the lower substrate 105 from the spacers 201. A scratch may be generated on the upper substrate 100 and the lower substrate 105. If the size of the spacers 201 is smaller than the cell gap, the spacers 201 cannot properly support the upper substrate 100 and the lower substrate 105.

FIG. 3A shows an example of a problem that a spherical spacer moves according to an external pressure, and FIG. 3B shows an example in which liquid crystal molecules are erroneously arranged because of the spacer moving according to an external pressure.

With reference to FIG. 3A, when an external pressure is applied to a liquid crystal display panel formed by attaching the upper and lower substrates 100 and 105, the spherical spacers 201 move in directions indicated by arrows from its determined position. In particular, when the spacers 201 are released from the black matrix region due to the pressure applied from outside, liquid crystal molecules arranged around the spacers 201 are disarranged due to the change in the position of the spacers, resulting in a light leakage around the spacers 201.

With reference to FIG. 3B, when an external pressure is applied to the attached liquid crystal display panel, the spherical spacer 201 is changed in its position and the liquid crystal molecules 205b arranged around the spacer 201 become unaligned. Liquid crystal molecules 205a are arranged to have an initial alignment direction. The change in position of the liquid crystal molecules 205b causes a light leakage around the spacer 201 which has been changed in its position.

SUMMARY

In one embodiment, a liquid crystal display ("LCD") device is capable of minimizing generation of a change in a position of a spacer due to an external pressure. The spacer may be formed through an ink jet spraying method according to one embodiment.

In a first aspect, a method for fabricating an LCD device includes forming an array substrate having gate lines and data lines substantially crossing each other. A color filter substrate is formed corresponding to the array substrate. An ink jet head is aligned either on the array substrate or on the color filter substrate and polyhedral spacers are sprayed through a plurality of nozzles provided at the ink jet head. Finally, the array substrate is attached with the color filter substrate.

In a second aspect, an LCD device includes a first substrate having gate lines and data lines. The data lines substantially cross the gate lines and the first substrate includes a first alignment film. A second substrate is coupled with the first substrate and the second substrate includes a color filter layer and a second alignment film. Polyhedral spacers are formed between the first alignment film and the second alignment film for maintaining a cell gap between the first substrate and the second substrate.

In a third aspect, a method for fabricating a liquid crystal display ("LCD") device includes providing a first substrate and a second substrate configured to be coupled together. Polyhedral spacers are provided to an ink jet head. The polyhedral spacers are dropped through a plurality of nozzles provided at the ink jet head onto either the first substrate or the second substrate. The first substrate is attached with the second substrate, such that the polyhedral spacers are between the first substrate and the second substrate.

The foregoing and other objects, features, aspects and advantages of the present embodiments will become more apparent from the following detailed description when taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

The liquid crystal display ("LCD") device and its fabrication in accordance with the present embodiments will now be described in detail with reference to the accompanying drawings.

Figure 1:
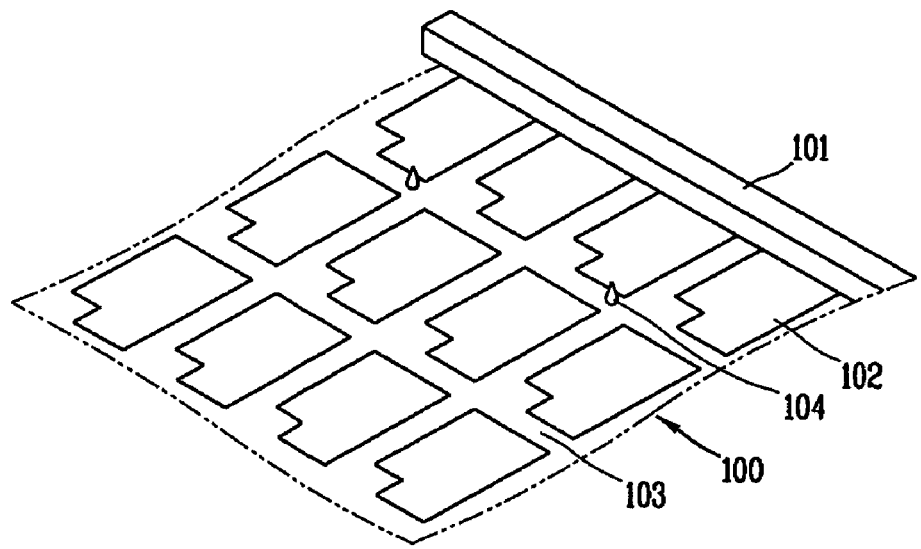
FIG. 1 is a perspective view showing a method for forming spacers according to a related art ink jet spraying method.
Figure 2:
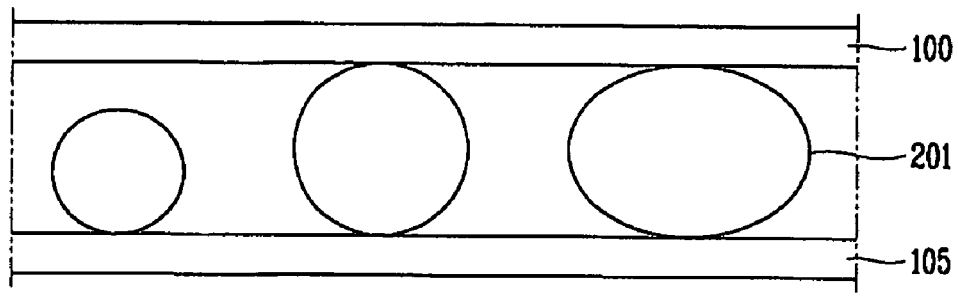
FIG. 2 shows a section of spacers formed according to a related art ink jet spraying method.
Figure 3A:
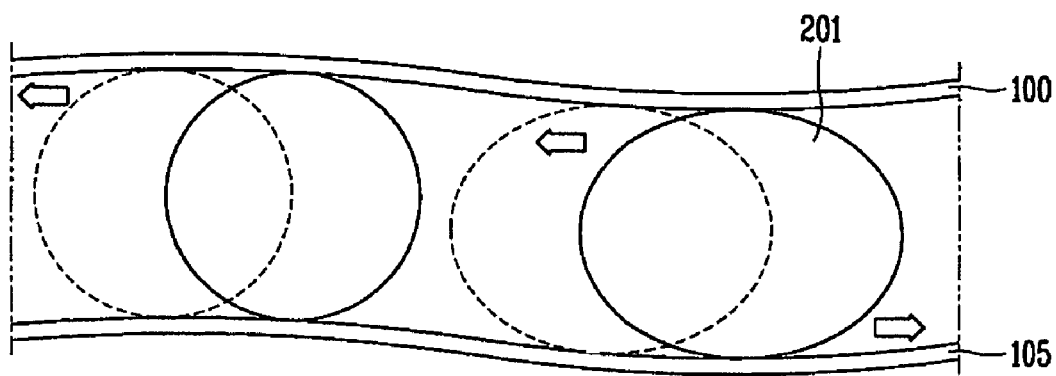
FIG. 3A shows an example of the problem of a spherical spacer moving upon the application of an external pressure according to the related art.
Figure 3B:
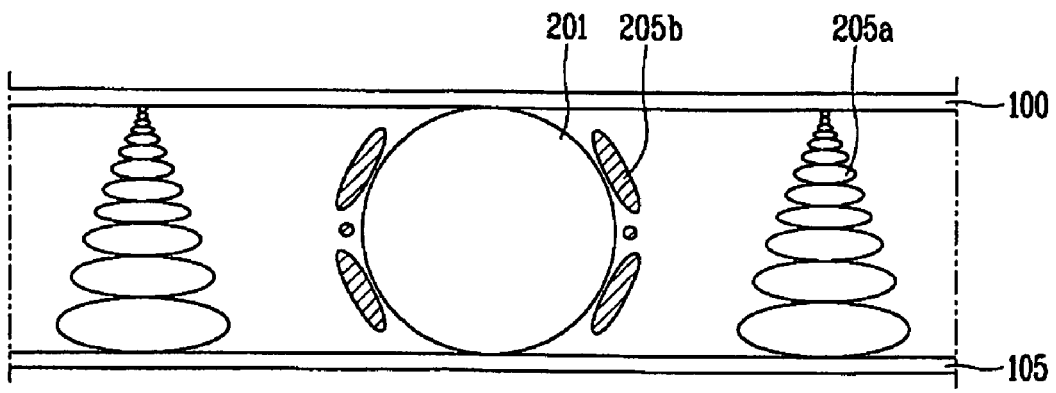
FIG. 3B shows an example of liquid crystal molecules being erroneously arranged due to the spacer moving from an external pressure according to the related art.
Figure 4A:
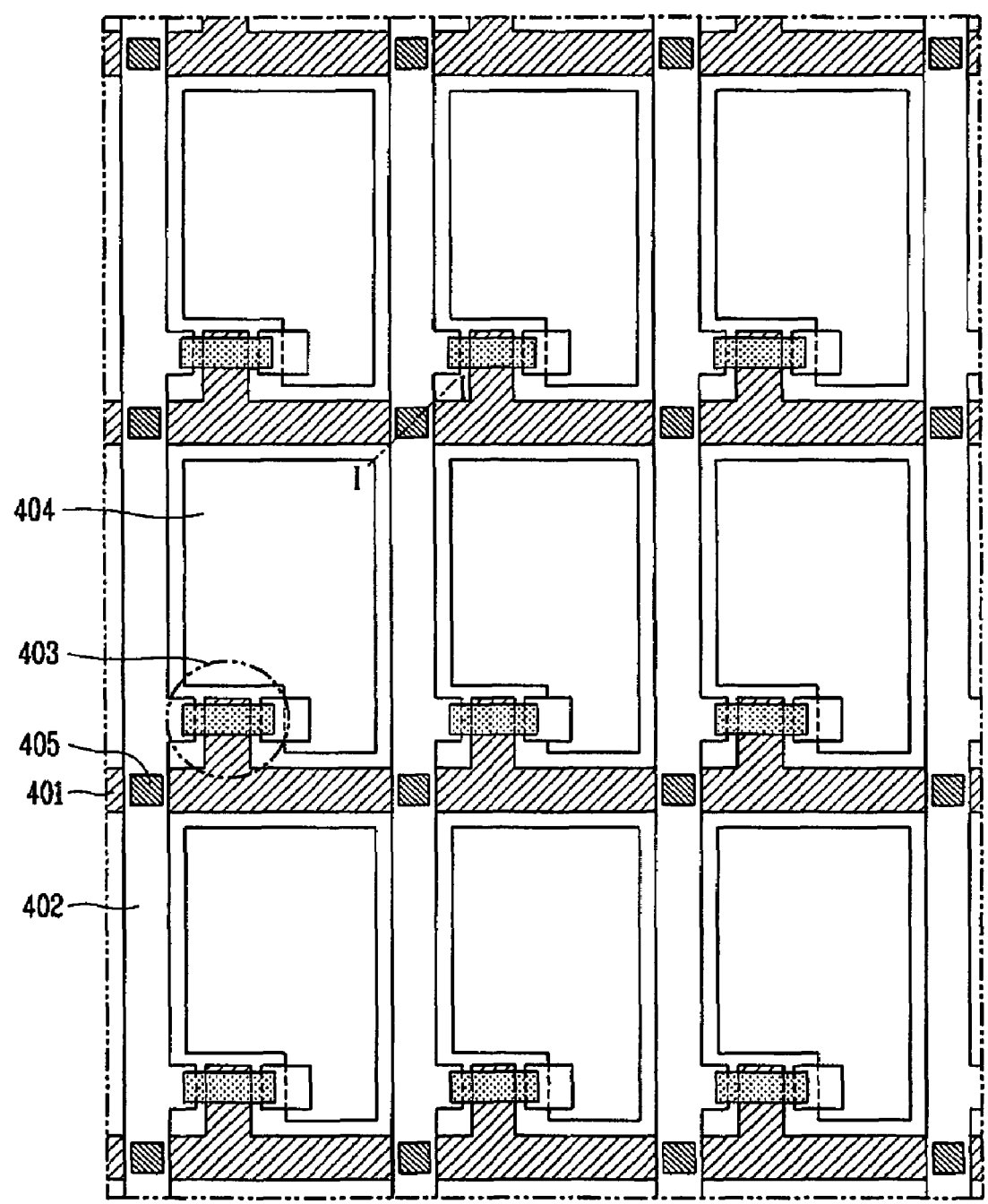
FIG. 4A is a plan view showing an array substrate including polyhedral spacers in accordance with one embodiment.

FIG. 4A is a plan view showing an array substrate including polyhedral spacers in accordance with one embodiment. As shown in FIG. 4A, a plurality of gate lines 401 and a plurality of data lines 402 substantially crossing the gate lines 401 are formed on an array substrate. As the gate lines 401 and data lines 402 are crossed, unit pixel regions are formed. Thin film transistors ("TFTs") 403 are formed as switching elements for driving corresponding pixels in each unit pixel region. In addition, a pixel electrode 404 may be formed to apply an electric field to a liquid crystal layer in each unit pixel region. The pixel electrode 404 may be made of a transparent conductive material such as indium tin oxide ("ITO"). Spacers 405 used for uniformly maintaining a cell gap between the array substrate and the color filter substrate may be formed on the array substrate. In one embodiment, the spacers 405 are formed at each crossing of a gate line 401 and a data line 402.

The spacers 405 may be formed on any portion on the array substrate. If the spacers 405, which are generally made of an opaque material, are formed on the pixel regions, an aperture ratio of the pixel regions may be decreased. Thus, in one embodiment, the spacers 405 may be formed on the gate lines 401 or the data lines 402, rather than on the pixel regions. In particular, spacers 405 being formed on the crossings of the gate lines 401 and data lines 402, may result in a high aperture ratio. Since the spacers 405 are formed by the ink jet spraying method which may control the position of formation of the spacers 405 as mentioned above, it is possible to selectively form the spacers 405 on the crossings of the gate lines 401 and the data lines 402.

Figure 4B:
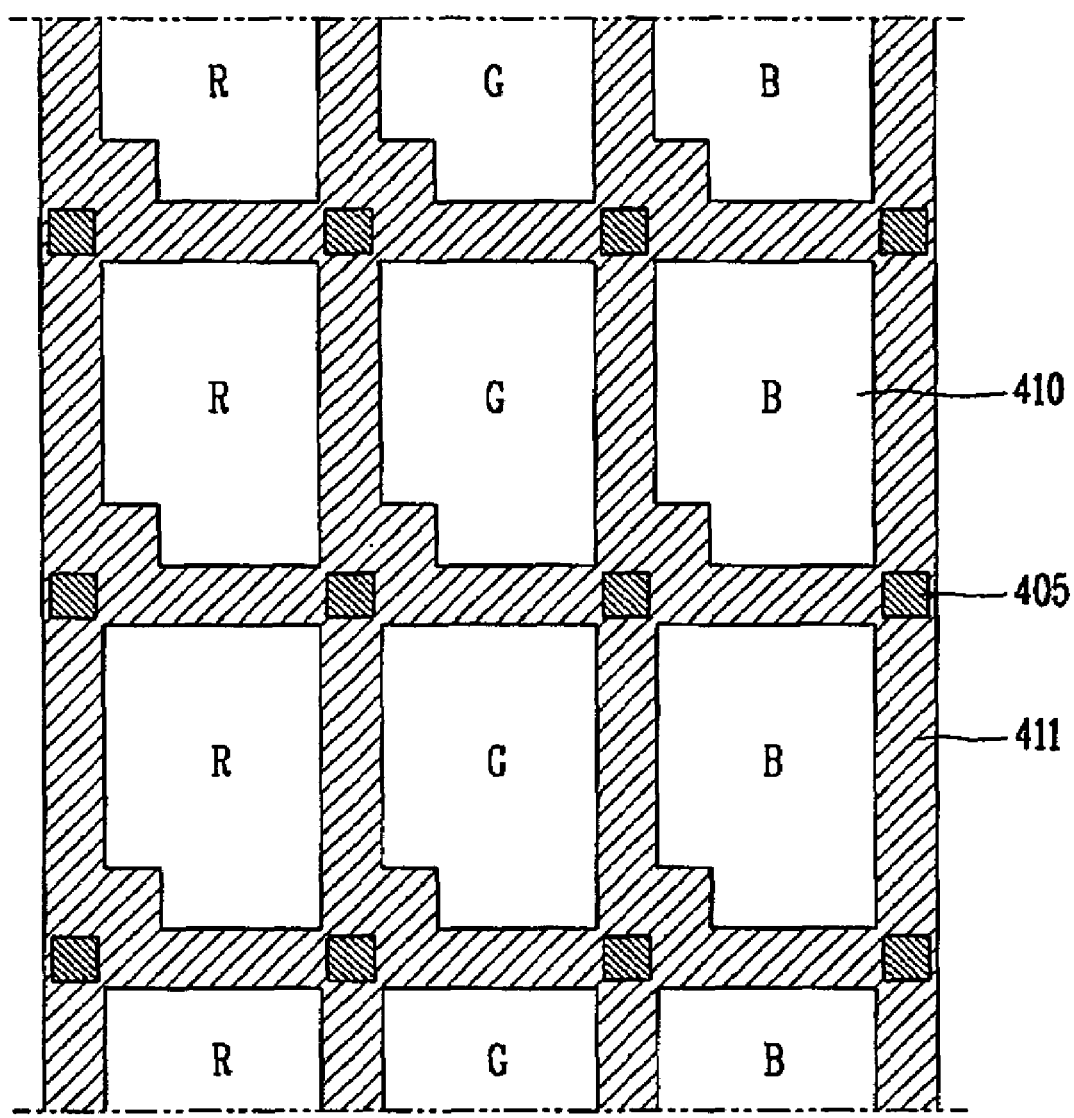
FIG. 4B is a plan view showing a color filter substrate including polyhedral spacers in accordance with one embodiment.

The structure of the color filter substrate attached to the array substrate in a facing manner will be described with reference to FIG. 4B. FIG. 4B is a plan view showing a color filter substrate including polyhedral spacers in accordance with one embodiment. The color filter substrate is constructed such that sub-color filter layers 410 corresponding to the unit pixel regions of the array substrate are arranged in a matrix form like the unit pixel regions of the array substrate. In this case, the sub-color filter layers 410 are separated by a black matrix 411 for preventing light leakage. The black matrix 411 is formed to cover the gate lines, the data lines and the TFT region on the array substrate.

Spacers 405 for uniformly maintaining the cell gap between the array substrate and the color filter substrate are formed on the black matrix 411. In particular, in one embodiment the spacers 405 are formed on the crossing of the black matrix 411. The spacers may be formed either on the array substrate or on the color filter substrate. According to one embodiment, it is assumed that the spacers are formed on the array substrate.

The array substrate and the color filter substrate with such structures as described above are attached such that the unit pixel regions and the sub-color filter layers correspond with one another precisely. In this case, the spacers formed between the array substrate and the color filter substrate maintain the cell gap between the array substrate and the color filter substrate.

Figure 5:
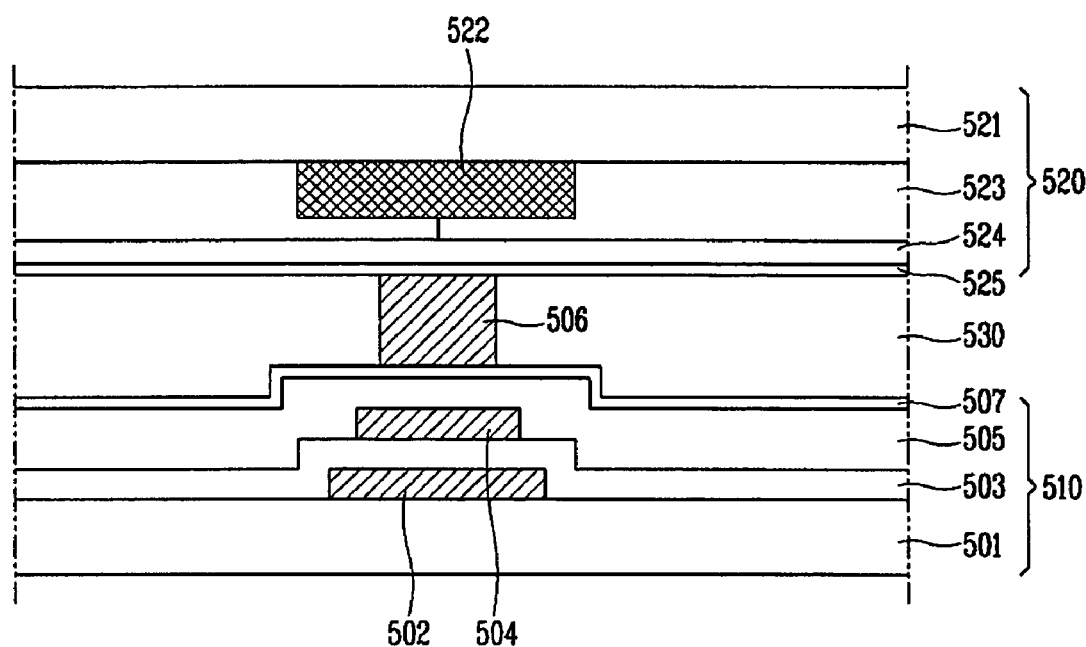
FIG. 5 is a sectional view showing a liquid crystal display panel including a spacer in accordance with one embodiment.

FIG. 5 is a sectional view showing a liquid crystal display panel including a spacer in accordance with one embodiment specifically showing a section of the liquid crystal display panel taken along line I-I in FIG. 4A. As shown in FIG. 5, as for an array substrate 510, a gate line 502 is formed on a first substrate 501 made of a transparent insulation material. A gate insulation layer 503 for insulating the gate line 502 is formed on the gate line 502, and a data line 504 which substantially crosses the gate line 502 is formed on the gate insulation layer 503. In addition, a passivation layer 505 for insulating the data line 504 and planarizing a certain step is formed on the data line 504. In addition, an alignment film 507 is formed on the passivation layer 505, and a polyhedral spacer 506 is formed on the alignment film 507 according to an ink jet spraying method. The use of the ink jet spraying method allows for an alignment layer to be present on both the substrates such that the polyhedral spacer may be formed between the alignment films. Since the spacer 506 is in a polyhedral shape such as a square, when the spacer 506 is sprayed on the substrate 501, its contact area with the substrate 501 is increased compared with a spherical spacer.

The spacer 506 is formed on the substrate 501 by using the ink jet spraying method, which mixes a plurality of unit solid spacers having polyhedral shape in a volatile solvent and sprays it. Sprayed together with the solvent, the solid spacers gather together when the solvent is volatilized. A drop of solvent sprayed on the substrate 501 may include a plurality of unit solid spacers. As the solvent is volatilized, the solid spacers gather together, and a plurality of unit spacers gather to form the independent spacer 506 supporting the cell gap. The spacer 506 formed by the ink jet method may be formed on the alignment film 507 formed with a thickness of hundreds of angstroms ("Å") for alignment of liquid crystal at a room temperature. The spacer formation process may be performed subsequently following an alignment film formation process and a rubbing process, so the processing time may be shortened and the productivity may be enhanced.

The color filter substrate 520, which corresponds to the array substrate 510, includes a black matrix 522 formed on a second substrate 521, a color filter layer 523 having sub-color filter layers which are separated by the black matrix 522, and an overcoat layer 524 for compensating a step of the color filter layer 523. A common electrode for forming an electric field into liquid crystal by making a pair with the pixel electrode formed on the array substrate 510 may be additionally formed on the overcoat layer 524. An alignment film 525 is formed on the overcoat layer 524 to determine an initial alignment direction of liquid crystals. Spacers 506 may be formed on the alignment film 525. As shown in FIG. 5, the polyhedral spacer is located above the alignment film 507 and below the alignment film 525.

In one embodiment, the spacers are formed at the crossings of the gate lines and data lines and have a polyhedral shape. In this case, since the spacers have the polyhedral shape, when the spacers are sprayed onto the substrate, the contact area of the spacers with the substrate is increased, and thus, the spacers may be prevented from being moved due to an external pressure. In the related art, where the spacers are limited to a spherical shape, the spacers make contact at a point with the substrate. The point contact may result in a light leakage because the spacers are easily moved when pressure is applied from outside. Comparatively, however, in one embodiment, since the spacers have a polyhedral shape, such as a square, to make the surface contact or a line contact with the substrate, the contact area with the substrate may be increased.

Figure 6:
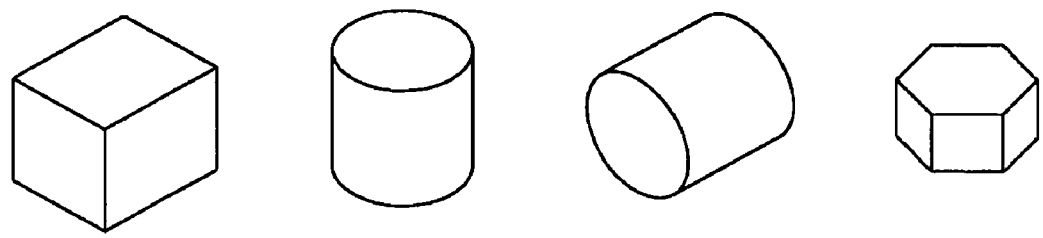
FIG. 6 shows examples of various types of polyhedral spacers in accordance with one embodiment.

FIG. 6 shows examples of various types of polyhedral spacers in accordance with the present embodiments. In the present embodiments, the spacers may have a cubic shape, a rectangular parallelepiped shape, a cylindrical shape or any other polyhedral shape. In particular, the spacers may have a regular polyhedral shape. The polyhedral spacers may result in increased contact area with the substrate even though the size of spacers is the unchanged as compared with a spherical spacer. Therefore, after the spacers are sprayed onto the substrate, the cell gap may be uniformly maintained. When the polyhedral spacers are formed on the alignment film, the surface of the spacers is processed to increase adherence power to improve attachment capability with the alignment film. This will be described in detail with reference to FIGS. 7A to 7C.

Figure 7A:
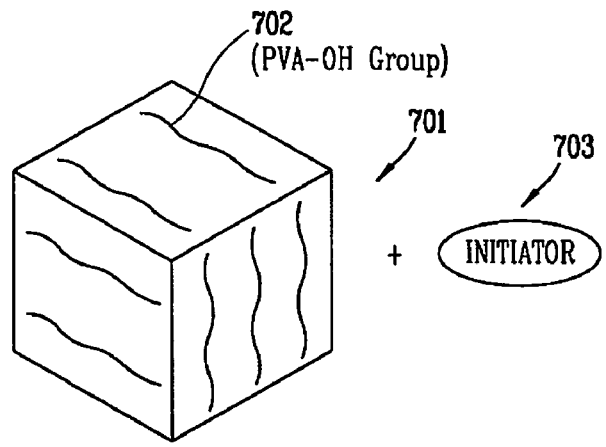
FIGS. 7A to 7C show sequential processes of processing the surface of a polyhedral spacer in accordance with one embodiment.
Figure 7B:
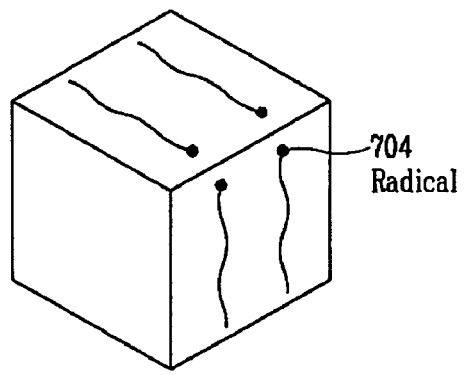
Figure 7C:
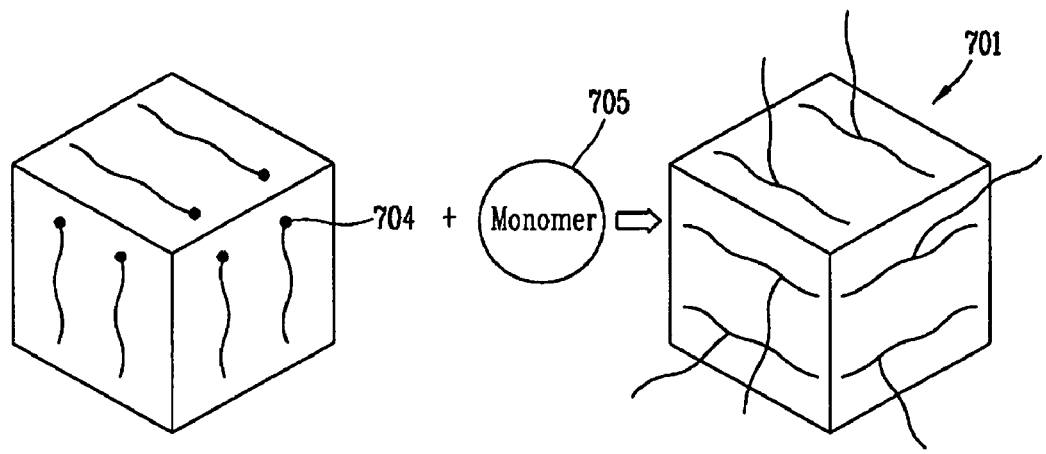

FIGS. 7A to 7C show sequential processes of processing a surface of a polyhedral spacer in accordance with an embodiment. With reference to FIG. 7A, a polyhedral spacer 701 is made of, for example, divinyl benzene. First, a plurality of unit solid spacers are mixed in a poly vinyl alcohol 702 group solution, a highly polymerized compound. In this case, the poly vinyl alcohol 702 comprises an OH group.

Subsequently, as shown in FIG. 7B, a redox initiator 703 for oxidization and deoxidization is added in the mixture to generate a radical 704. The radical 704 is formed by polymerization with metal salt, e.g., $Ce^{4+}$, $B^{5+}$, $Cr^{6+}$, $Mn^{3+}$, etc., contained in the OH group and the redox initiator 703.

Finally, as shown in FIG. 7C, a monomer 705 comprising an alkyl group having a double bond for polymerization is added in the radical 704 formed through the chemical reaction to perform polymerization. As a result, a surface processed layer having a redundancy coupler, which remains after a chain of the dual bond is released, is formed on the surface of the polyhedral spacer 701. The surface processed layer interacts with the alignment film, and the organic film, to improve its bonding capability with the alignment film.

Accordingly, because the polyhedral spacers have the surface processed layer, they may be strongly attached on the surface of the substrate such that they cannot be moved in spite of an external pressure. Accordingly, a light leakage phenomenon that may be caused by movement of spacers may be prevented. The polyhedral spacers may be made of a photosensitive organic material through a photolithography process. Namely, after a photosensitive organic material is coated with a certain thickness and then formed in a certain pattern by performing the photolithography process, the polyhedral spacers formed in the certain pattern may be retrieved. The retrieved spacers may be mixed in a volatile solvent and then supplied to the ink jet spray nozzle.

The process of spraying the polyhedral spacers onto the substrate by using the ink jet spraying method will be described. After the ink jet head is positioned on the color filter substrate or on the array substrate constituting the liquid crystal display panel, the solution containing the polyhedral spacers is sprayed onto the substrate through the spray nozzle of the ink jet head. As the volatile solvent of the sprayed solution is volatilized, only the polyhedral spacers remain on the surface of the substrate. While the solvent is being volatilized, the polyhedral spacers gather to complete one spacer.

The process is performed through sprayed drops of every unit solution, so that spacers are uniformly formed over the entire substrate. In addition, since the polyhedral spacers include the surface processed layer, their bonding force with the alignment film made of polyimide may be improved, so the spacers exert stronger bonding force with the alignment film during the volatilization process. Therefore, the spacers in accordance with an embodiment have advantages resulting from their polyhedral shape. The contact area with the substrate may be increased, and in addition, since the polyhedral spacers have the surface processed layer, their bonding force with the alignment film may be improved and thus a change in their position due to an external pressure may be prevented.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
   a first substrate having gate lines and data lines, the data lines substantially crossing the gate lines, wherein the first substrate includes a first alignment film;
   a second substrate coupled with the first substrate, the second substrate including a color filter layer and a second alignment film;
   a plurality of independent spacers formed between the first alignment film and the second alignment film for maintaining a cell gap between the first substrate and the second substrate, wherein the independent spacer is formed a plurality of unit solid polyhedral spacers; and
   a surface processed layer on the surface of the unit solid polyhedral spacers to increase adhesive strength with the first and second alignment films, wherein the surface processed layer has a redundancy coupler which remains after a chain of the dual bond is released.

2. The device of claim 1, wherein the plurality of independent spacers are on the crossings of the gate lines and the data lines.

3. The device of claim 1, wherein the unit solid polyhedral spacers have a cubic shape.

* * * * *

UNITED STATES PATENT AND TRADEMARK OFFICE
CERTIFICATE OF CORRECTION

PATENT NO. : 7,643,111 B2  Page 1 of 1
APPLICATION NO. : 11/435679
DATED : January 5, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Twenty-first Day of December, 2010

David J. Kappos
*Director of the United States Patent and Trademark Office*